(12) United States Patent  
Lee

(10) Patent No.: US 8,442,118 B2
(45) Date of Patent: May 14, 2013

(54) CALCULATING TRANSFORMATION PARAMETERS FOR IMAGE PROCESSING

(75) Inventor: Wei Pien Lee, Eindhoven (NL)

(73) Assignee: Entropic Communications, Inc., San Diego, CA (US)

( * ) Notice: Subject to any disclaimer, the term of this patent is extended or adjusted under 35 U.S.C. 154(b) by 1297 days.

(21) Appl. No.: 11/915,489

(22) PCT Filed: May 19, 2006

(86) PCT No.: PCT/IB2006/051608
§ 371 (c)(1),
(2), (4) Date: Nov. 26, 2007

(87) PCT Pub. No.: WO2006/129224
PCT Pub. Date: Dec. 7, 2006

(65) Prior Publication Data

US 2008/0205525 A1     Aug. 28, 2008

(30) Foreign Application Priority Data

May 31, 2005   (EP) .................................. 05104670

(51) Int. Cl.
*H04N 11/02*   (2006.01)
(52) U.S. Cl.
USPC .................. 375/240.22; 375/240.01; 382/248; 382/253
(58) Field of Classification Search ......................... None
See application file for complete search history.

(56) References Cited

U.S. PATENT DOCUMENTS

| | | | |
|---|---|---|---|
| 4,974,084 A | 11/1990 | Fernando | |
| 6,160,917 A | 12/2000 | Sommer | |
| 6,298,144 B1 | 10/2001 | Pucker, II et al. | |
| 6,501,796 B1 | 12/2002 | Dusseux et al. | |
| 6,809,758 B1 | 10/2004 | Jones | |
| 2002/0186771 A1 | 12/2002 | Nakaya et al. | |
| 2004/0006736 A1 | 1/2004 | Kawatani | |
| 2004/0160974 A1* | 8/2004 | Read et al. | 370/431 |
| 2007/0192812 A1* | 8/2007 | Pickens et al. | 725/94 |

FOREIGN PATENT DOCUMENTS

| | | |
|---|---|---|
| CN | 1495644 | 5/2004 |
| EP | 0 897 247 | 11/1998 |
| EP | 1 117 251 | 12/2000 |
| JP | 11-331851 | 11/1999 |
| JP | 2002-042120 | 2/2002 |

(Continued)

OTHER PUBLICATIONS de Haan, G. et al.: "True-Motion Estimation With 3-D Recursive Search Block Matching," IEEE Transactions on Circuits and Systems for Video Technology, IEEE Service Center, Piscataway, NJ, US, vol. 3, No. 5, Oct. 1, 1993, pp. 368-379, ISSN: 1051-8215.

(Continued)

*Primary Examiner* — Donald Mills
(74) *Attorney, Agent, or Firm* — Bruce Greenhaus; Duane Morris LLP

(57) ABSTRACT

The invention relates to a method for obtaining transformation parameters. A camera motion can be modeled by providing a vector field of motion vectors describing estimated motion vectors, projecting the vector field on at least one axis, and deriving the transformation vector parameters from the projection of the vector fields. As the camera motion can be modeled by way of translation, scale and rotation, the projections of the vector field on the axis can be used.

19 Claims, 6 Drawing Sheets

FOREIGN PATENT DOCUMENTS

Figure 1:
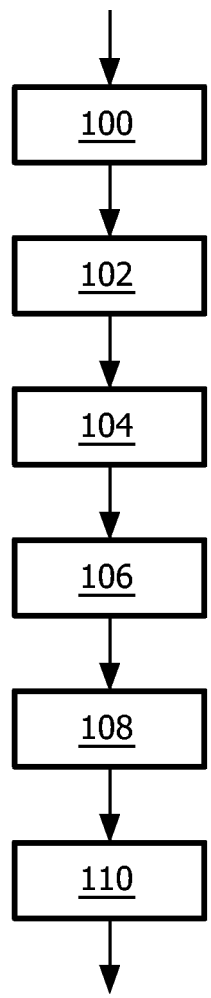

| | | |
|---|---|---|
| RU | 2096927 | 11/1997 |
| RU | 2209527 | 11/1997 |
| WO | 01/15456 | 3/2001 |
| WO | 2006/129224 | 12/2006 |

OTHER PUBLICATIONS de Haan and Biezen: "Sub-pixel motion estimation with 3-D recursive search block-matching," Signal Processing: Image Communications 6, 1994, pp. 229-239.

Joon-Seek, K. et al.: "A fast feature-based block matching algorithm using integral projections," IEEE Journal on Selected Areas in Communications, IEEE Service Center, Piscataway, NJ, US, vol. 10, No. 5, Jun. 1, 1992, pp. 968-971, XP000276102, ISSN: 0733-8716, the whole document.

Robinson, D. et al.: "Fast Local and Global Projection-Based Methods for Affine Motion Estimation," Journal of Mathematical Imaging and Vision, Kluwer Academic Publishers, NL, No. 18, 2003, pp. 35-54, XP002362840, ISSN: 0924-9907, the whole document.

* cited by examiner

CALCULATING TRANSFORMATION PARAMETERS FOR IMAGE PROCESSING

The invention relates in general to a method for obtaining transformation parameters.

The invention further relates to a computer program and a computer program product for obtaining transformation parameters. Further, the invention relates to a device for obtaining transformation parameters, and the use of a method for obtaining motion vector transformation parameters in video compression systems.

Motion estimation is important in many fields of image processing. For example, during video compression, it is necessary to predict the pixel values in consecutive video frames. The prediction allows calculating the pixel values in the receiver without transmitting these through a transmission channel. The goal of prediction is that the overall difference with the actual pixel values is minimized, to allow the receiver to calculate a best possible image. With a minimized overall difference in the predicted pixel values, a significantly reduced amount of data has to be coded and transmitted for the reconstruction of the original frame.

The image data comprises predicted values by means of vector fields and the error or residue. The amount of residue depends on the accuracy of the vector field. The vector field is a description of a motion model of the pixel values.

Obtaining a vector field is described in de Haan, Biezen, "Sub-pixel motion estimation with 3-D recursive search block-matching", Signal Processing: Image Communications 6, 1994, pp. 229-239.

However, obtaining transformation parameters from the vector fields is expensive in terms of computational effort.

Therefore, it is one object of the invention to provide obtaining transformation parameters with reduced computational effort. Another object of the invention is to provide an optimized motion model for motion prediction. A further object of the invention is to provide an improved compression of images.

These and other objects of the invention are solved by a method for obtaining transformation parameters from a vector field with projecting the vector field on at least one axis, and deriving the transformation parameters from the projection of the vector field.

For example, a vector field describing estimated motion vectors in an image, in particular in a video image, may be obtained using a common motion prediction method. The transformation parameters, for example, translation, scale, and rotation, can be obtained by projecting the vector field on at least one axis. The vector field can be comprised of vectors. The vectors can be composed of at least two components, for example, an x-component and a y-component. The x-component can be perpendicular to the y-component. The vector field can be described within a coordination system, with corresponding axes. One axis can be the x-axis, and the other axis can be the y-axis. Other coordination systems are as well possible. The transformation parameters can describe motion model parameters. The transformation parameters can be used to generate vector fields. The transformation parameters can be easily obtained, when the vector field is projected onto at least one of the axes, preferably on both axes. In particular, when projecting the vectors within the vector fields on each of the axis within the coordination system, and using all derived functions, the transformation parameters can be obtained easily.

The vectors can be comprised of at least two components, one for each axis. Each of the components can be parallel to one of the axes of the coordination system. Then, the projection onto the axes allows obtaining the respective components of the vectors within the vector field.

By projecting the vector field onto at least one axis, the transformation parameters can be isolated. For example, the scale parameter, the translation parameter, and the rotation parameter can be isolated using the projection. Within these projections multiplier values, and mean values can be obtained, which can be used to calculate the gain, e.g. scale parameter, or rotation parameter, and/or the off-set, e.g. translation parameter, correspondingly.

For example, in applications, it may be easier to handle motion model parameters, e.g. when a homemade video sequence has to be stabilized. This may require knowledge of the translation, and the rotation parameters. After calculating these parameters, the image as whole can be translated and rotated. This may lead to better results than handling the vectors individually.

Further, the motion vector field as such may not always be accurate and, therefore, finding motion model parameters according to embodiments could average out the errors, e.g. the deviations and/or the outliers. When the motion vector field is accurate, objects in the sequence may have different motion than the one of camera, which will result in a complex motion vector field. If the motion of the objects are small enough, then for the same reason as mentioned earlier, the motion of these objects can be averaged out. In general, the motion model parameters according to embodiments may represent the global motion.

From the projections, the total transformation parameters can be obtained. For example, according to embodiments, a displacement equation can be calculated with all projections of the vectors onto all axes. The matrices of the transformation equation have unknown elements, however, these elements can be obtained by means of a trigonometry equation. For instance, the multipliers, and mean values of the projections of the vector fields can be obtained from a curve fit method. For example, by calculating a line fit based on the least squared error of the distance to that line, or a polynomial fit method or an exponential fit method. This may allow calculating gain and off-set, i.e. scale/rotation and translation. Such an embodiment is an example optimized for complexity i.e. simple implementation and fast in execution. The output of the embodiment can be the off-set and gain.

According to other embodiments, these values can be obtained using the primitive function of the projections. The primitive functions can be according to embodiments, obtained using the Euler method.

With the primitive functions the area of the projection can be calculated, which is related to the multiplier. If the mean value or the translation parameter is disregarded, then the total area of the projection is related to the extreme of the primitive function. The extreme of the primitive function may lie on the point where its derivative function is zero. Once the extreme of the primitive function is found, the multiplier value may be calculated.

As the motion is often modeled by translation, scale, and rotation, and this motion is introduced most often by camera motion, the translation parameters represent, according to embodiments, a global model of camera motion.

A recursive method may also be possible, according to embodiments. A vector field based on the vector transformation parameters may be reconstructed and fed back to the initial motion estimation for calculating a vector field.

Another embodiment may provide calculating the transformation parameters using recursive calculation. Transformation parameters could be obtained using the embodiments as described above. Then, these parameters may be used to reconstruct the vector field. Within this reconstructed vector field, outliners may be identified in the original vector field. These outliners may be masked. With the masked outliners in the vector field, new vector transformation parameters may be calculated obtaining better results.

Another aspect of the invention is a computer program operable to cause a processor, when operated, to obtain transformation parameters by way of obtaining a vector field of motion vectors describing estimated motion vectors in an image, projecting the vector field on at least one axis, and deriving the transformation parameters from the projection of the vector field.

Another aspect of the invention is a computer program product with a computer program operable to cause a processor, when operated, to obtain transformation parameters by way of obtaining a vector field, projecting the vector field on at least one axis, and deriving the transformation parameters from the projection of the vector field.

Another aspect of the invention is a device arranged for obtaining transformation parameters, comprising estimation means arranged for obtaining a vector field, projecting means arranged for projecting the vector field on at least one axis, and calculation means, arranged for deriving the transformation parameters from the projection of the vector field.

Another aspect of the invention is to use of a method according to claim 1 in video compression.

Figure 2:
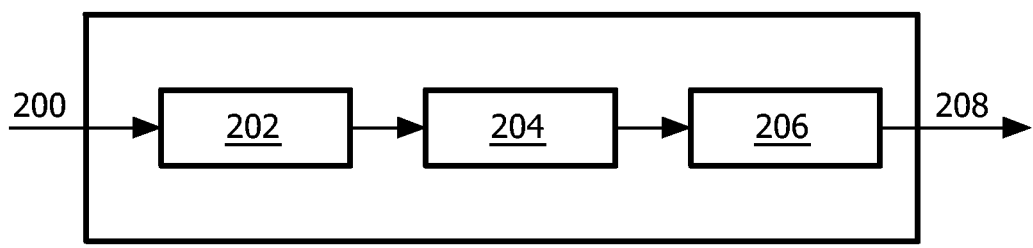
Figure 3:
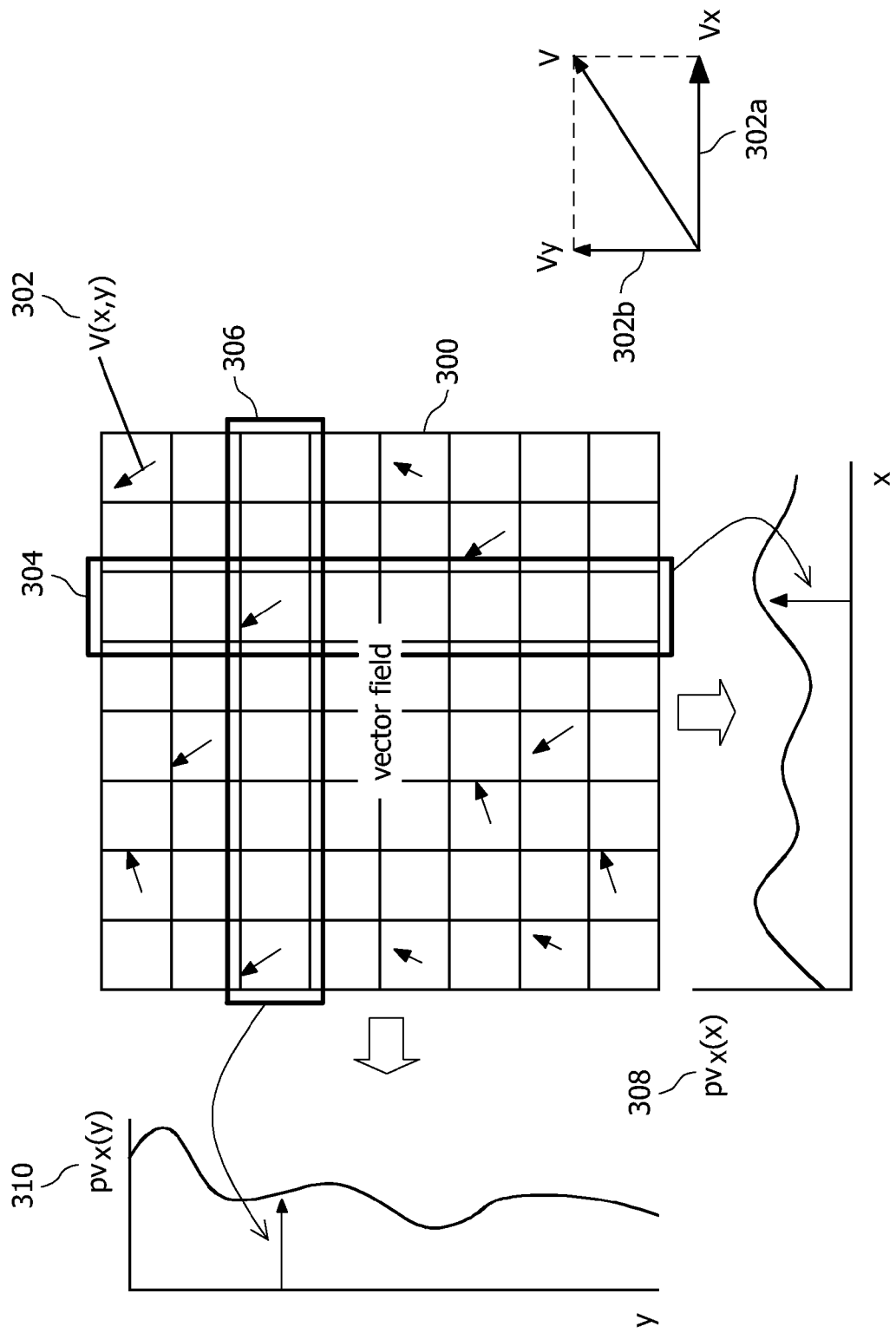
Figure 4:
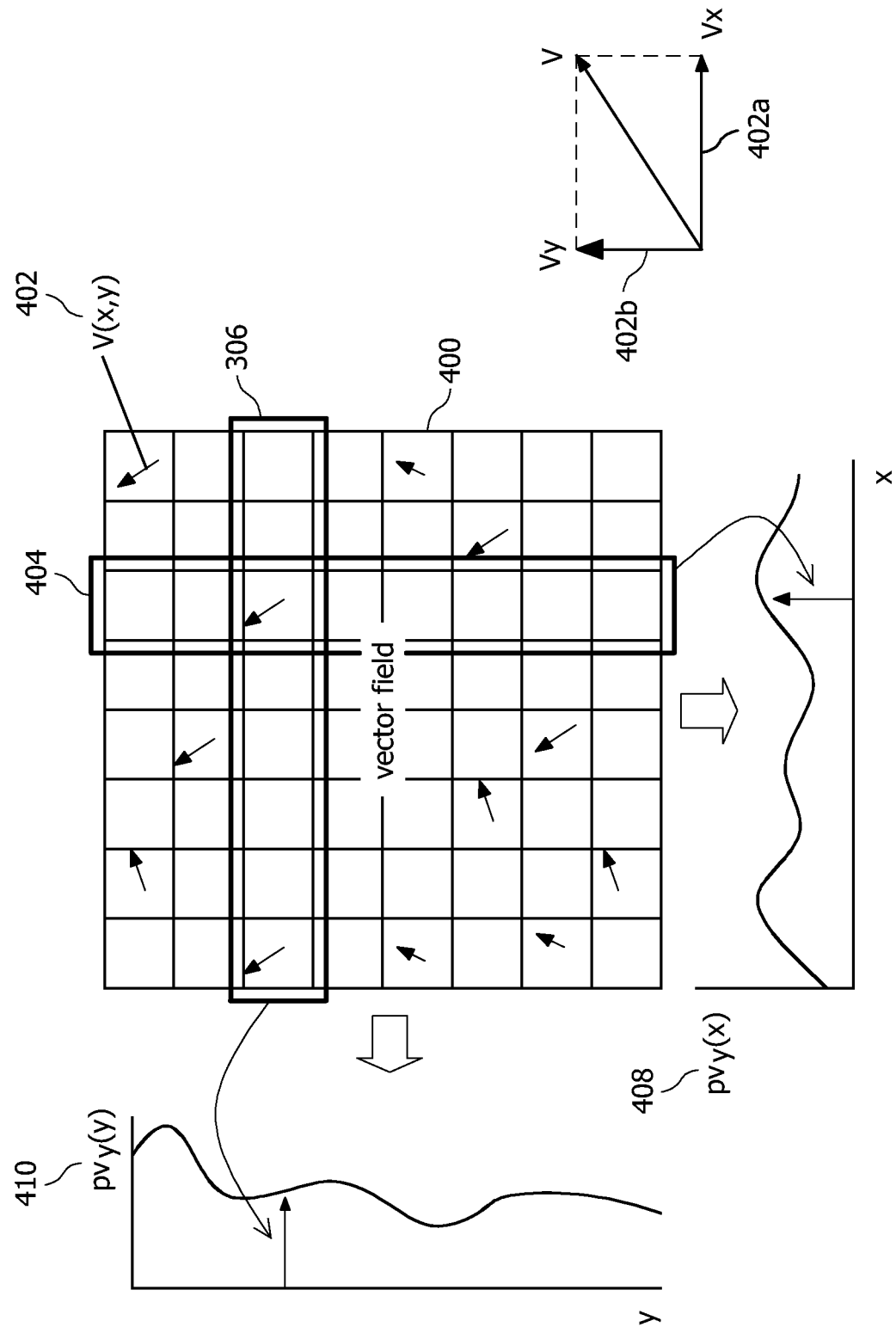
Figure 5:
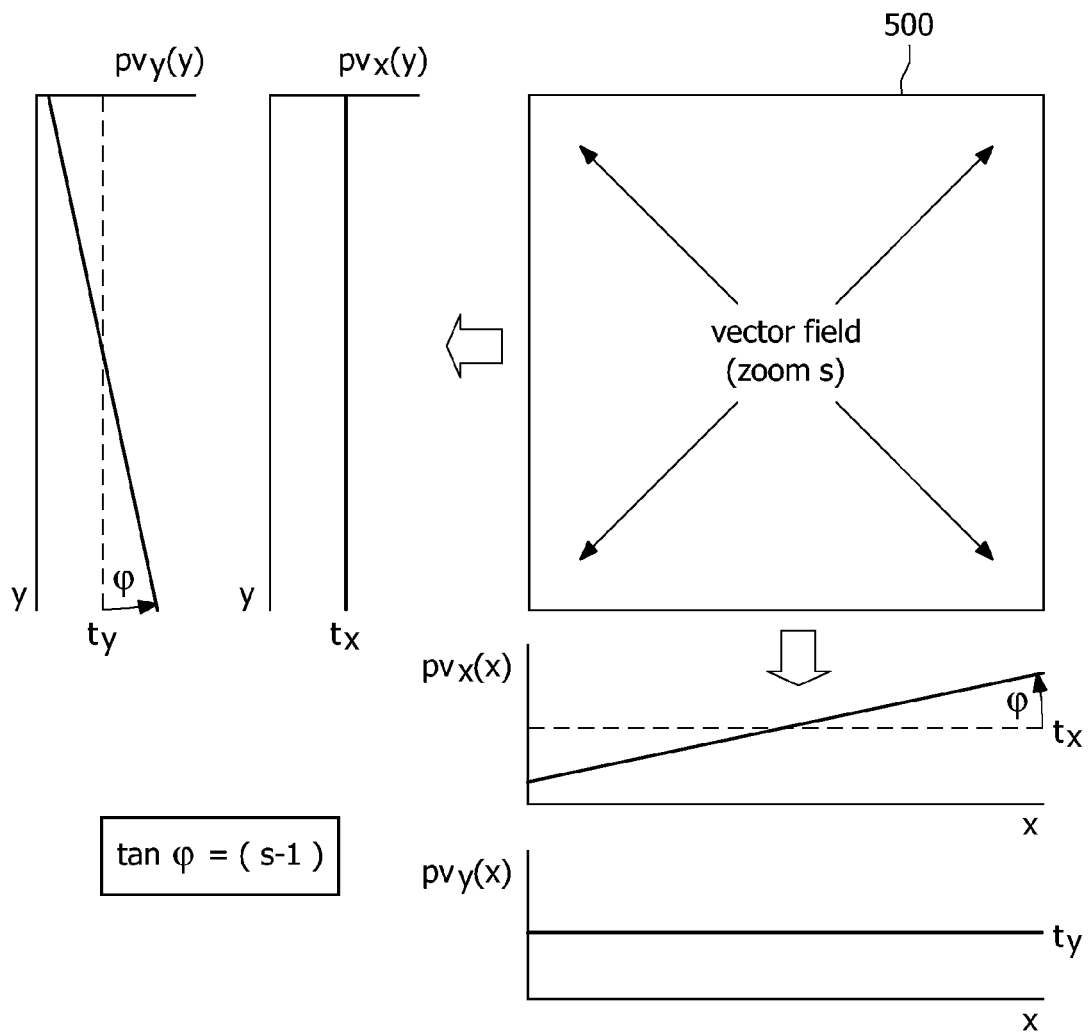
Figure 6:
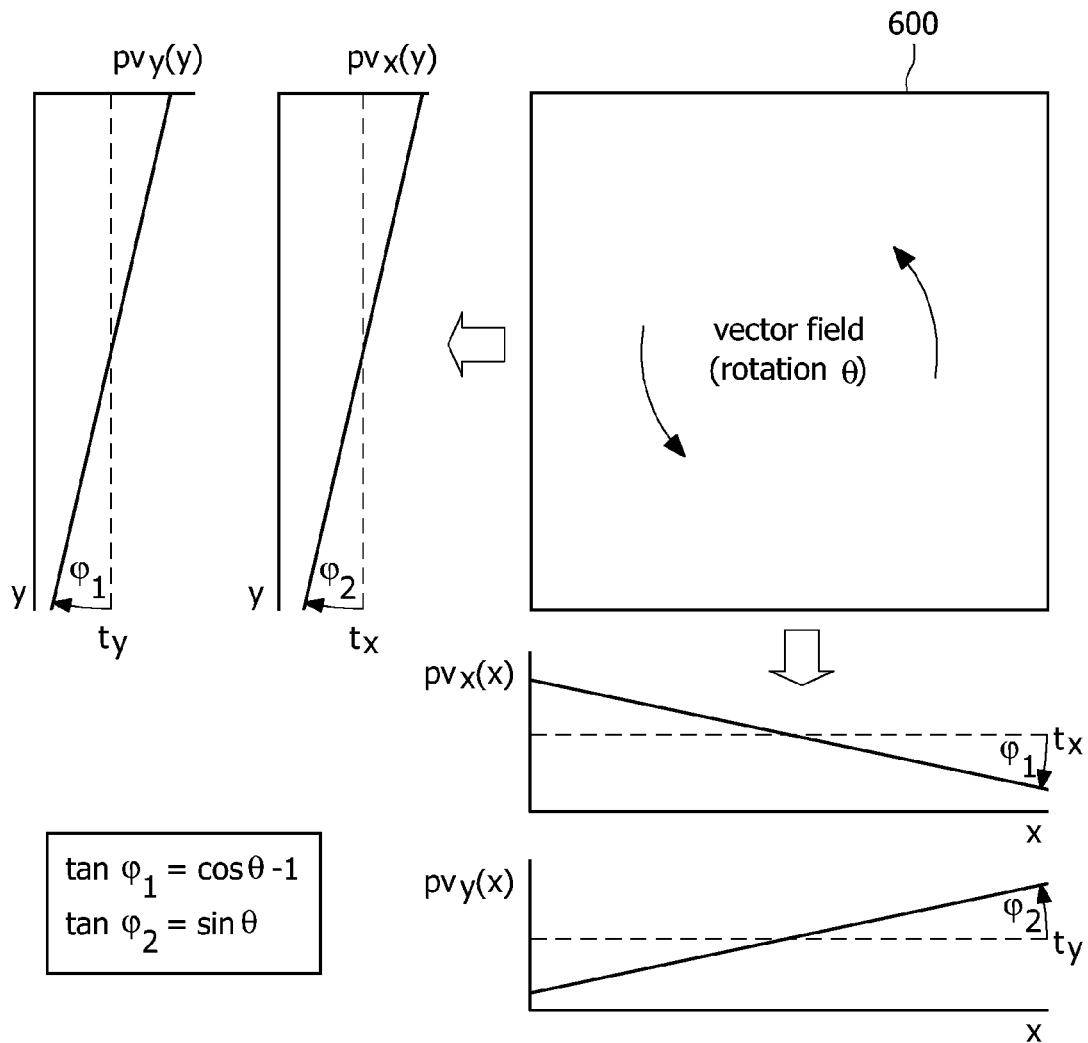
Figure 7:
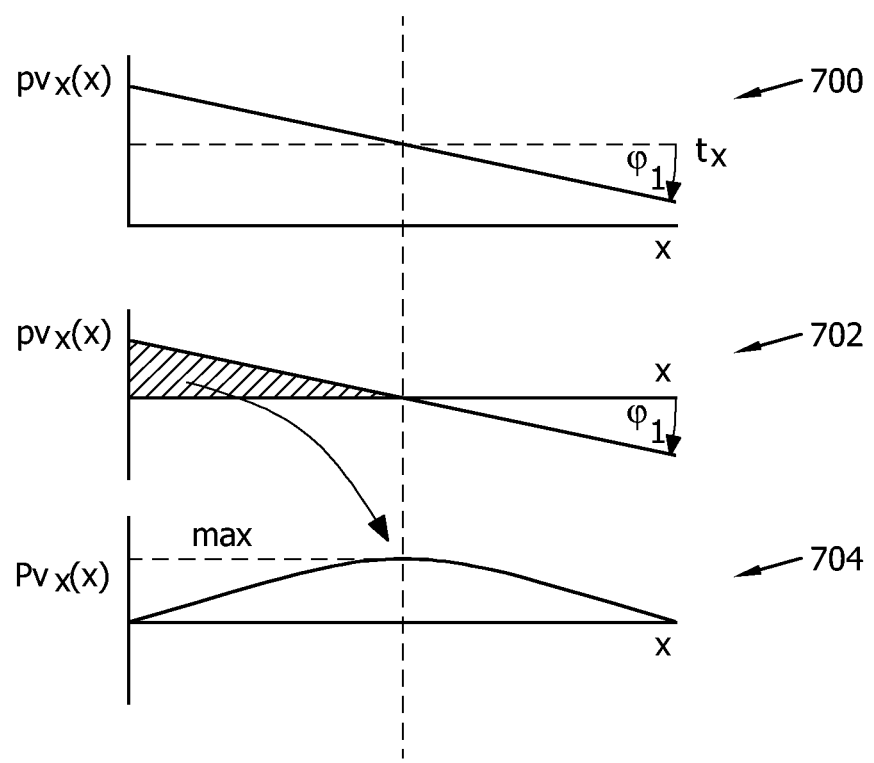

These and other aspects of the invention will be apparent from and elucidated with reference to the following Figures. In the Figure show:

FIG. 1 a flowchart of an inventive method according to embodiments;

FIG. 2 a device for providing the inventive method according to embodiments;

FIG. 3 a projection of vector x-components on the x-axis and the y-axis;

FIG. 4 a projection of vector y-components on the x-axis and the y-axis;

FIG. 5 an illustration of a scale transformation of a vector field;

FIG. 6 an illustration of a rotation transformation of a vector field;

FIG. 7 an illustration of a relation between gain and the projection function.

FIG. 1 illustrates a flowchart of a method for obtaining transformation parameters from video images.

The majority of pixel motion is caused by camera movements. Therefore, one approach to improve motion estimation is to provide a global motion model of the camera. This motion can be modeled by translation, scale and rotation values. Translation, scale and rotation can be described by mathematical models, which will be explained below. In the following, the variables are as follows:

$v_q(bx,by)$: q-component of vector on position (bx, by)
$pv_q(r)$: projection of q-component of vectors as function of r
bq: vector index in vector field
$N_{bq}$: Number of vectors in q direction
q and r: is either x or y
x: x-axis component of the vector field
y: y-axis component of the vector field
x': transformed x-component of the vector field after motion estimation
y': transformed y-component of the vector field after motion estimation
$\Theta$: rotation angle
s: scale parameter
t: translation parameter Assuming that the origin of the axis is in the center of an image frame, the translation can be described as $[x'y'] = [xy] + \lfloor t_x, t_y \rfloor = [xy] + T.$ The scale transformation can be described as $$[x'y'] = [xy]\begin{bmatrix} s_x & 0 \\ 0 & s_y \end{bmatrix}.$$

In particular in the field of video processing the scale parameter as may often be defined by the optical properties of the cameras and that the pixel aspect ratio is equal to 1. In this case, the scale parameter s can be a single parameter. Then, the above equation reduces to $[x'y'] = [xy]s.$ Rotation of the camera can be described by $$[x'y'] = [xy]\begin{bmatrix} \cos\Theta & \sin\Theta \\ -\sin\Theta & \cos\Theta \end{bmatrix} = [xy]R(\Theta).$$

The overall transformation can be described by rotation, scale and translation according to the following equation.

$[x'y'] = [xy]sR(\Theta) + T.$

In order to calculate the transformation parameters, a vector field of motion estimated vectors is necessary. Therefore, this vector field is calculated (100) according to commonly known methods. With this vector field, a projection of the x-component of the vector field on the x-axis (102) is carried out. This projection can be described as $$pv_x(bx) = \frac{1}{N_{by}} \sum_{by}^{N_{by}} v_x(bx, by).$$

The x-component of the vector field can further be projected onto the y-axis (104), which projection can be described as $$pv_x(by) = \frac{1}{N_{bx}} \sum_{bx=1}^{N_{bx}} v_x(bx, by).$$

The projection of x-components on the axes is illustrated in FIG. 3. Illustrated is a vector field 300 with estimated motion vectors V(x,y) 302. Each vector V(x,y) 302 can be divided into x-components 302a and y-components 302b. An image may be segmented into columns 304 and rows 306.

Each column 304 can be projected onto the x-axis. The average of the vector x-components of all vectors in each of the columns 304 is considered as the projection $pv_x$(column). The projection over all columns results in the projection function $pv_x(x)$ 308.

Each row 306 can be projected onto the y-axis. The average of the vector x-components of all vectors in each of the rows 306 is considered as the projection $pv_x$(row). The projection over all rows results in the projection function $pv_x(y)$ 310.

The resulting projection functions $pv_x(x)$ 308, and $pv_x(y)$ 310 represent the average values of the x-components of the vectors in the motion estimated vector field 300.

Besides the x-components of the vector field, also the y-components of the vector field can be projected. The projection on the x-axis (106) can be described as $$pv_y(bx) = \frac{1}{N_{bv}} = \sum_{y=1}^{N_{bv}} v_y(bx, by)$$

and the projection on the y-axis (108) can be described by $$pv_y(by) = \frac{1}{N_{bx}} = \sum_{x=1}^{N_{bx}} v_y(bx, by).$$

The projection of y-components on the axes is illustrated in FIG. 4. The same reference number refer to the same elements, e.g. 400 refers to 300, etc.

Illustrated is a vector field 400 with estimated motion vectors V(x,y) 402. Each vector V(x,y) 402 can be divided into x-components 402a and y-components 402b. An image may be segmented into columns 404 and rows 406.

Each column 404 can be projected onto the x-axis. The average of the vector y-components of all vectors in each of the columns 404 is considered as the projection $pv_y$(column). The projection over all columns results in the projection function $pv_y$(x) 408.

Each row 406 can be projected onto the y-axis. The average of the vector y-components of all vectors in each of the rows 306 is considered as the projection $pv_y$(row). The projection over all rows results in the projection function $pv_y$(y) 410.

The resulting projection functions $pv_x$(x) 308, and $pv_y$(x) 310 represent the average values of the x-components of the vectors in the vector field 300.

When applying scale transformation and translation to the vector field, it can be rewritten as $$[v_x v_y] = [x'y'] - [xy]$$

$$[v_x v_y] = [xy](s-1) + T$$

The projection of the scaled and translated x-component on the x-axis can be described as $$pv_x(x) = \frac{1}{N_y} = \sum_{y=-\frac{N_y}{2}}^{\frac{N_y}{2}} (x(s-1) + t_x)$$

$$pv_x(x) = x(s-1) + t_x$$

which is a first order function of x, where the scale parameter s is a multiplier and the translation $t_x$ is equal to the mean value.

Further, the projection of the x-component of the vector field on the y-axis may reveal $$pv_x(y) = \frac{1}{N_x} = \sum_{x=-\frac{N_x}{2}}^{\frac{N_x}{2}} (x(s-1) + t_x)$$

$$pv_x(y) = t_x,$$

where the translation $t_x$ is a constant. Further, the projection of the y-component of the vector field on the x-axis may reveal $$pv_y(x) = \frac{1}{N_y} = \sum_{y=-\frac{N_y}{2}}^{\frac{N_y}{2}} (y(s-1) + t_y)$$

$$pv_y(x) = t_y,$$

where the translation $t_y$ is constant. Eventually, the projection of the y-component of the vector field onto the y-axis may reveal $$pv_y(y) = \frac{1}{N_x} = \sum_{x=-\frac{N_x}{2}}^{\frac{N_x}{2}} (y(s-1) + t_y)$$

$$pv_y(y) = y(s-1) + t_y,$$

which is a first order function of y, where the scale parameter s is a multiplier and the translation $t_y$ is equal to the mean value. The above equations show that the translation and scale parameters may be derived from the properties of the projections of the vector field on the axes. The gain/multiplier (tan φ) is related to the scale parameter or the rotation parameter, while the average value of the projection function may represent the translation.

Besides translation and scale transformation, camera rotation can as well be described. The displacement of the vector field resulting from rotation can be described by $$[v_x v_y] = [x'y'] - [xy]$$

$$[v_x v_y] = [xy](R-I) + T$$

R relates to the rotation matrix, I an identity matrix and T the translation.

The projection of the x-component of the vector field on the x-axis can be described by $$pv_x(x) = \frac{1}{N_y} = \sum_{y=-\frac{N_y}{2}}^{\frac{N_y}{2}} (x(\cos\Theta - 1) - y\sin\Theta + t_x)$$

$$pv_x(x) = x(\cos\Theta - 1) + t_x$$

The projection of the x-component of the vector field on the y-axis can be described by $$pv_x(y) = \frac{1}{N_x} = \sum_{x=-\frac{N_x}{2}}^{\frac{N_x}{2}} (x(\cos\Theta - 1) - y\sin\Theta + t_x)$$

$$pv_x(y) = y(\cos\Theta - 1) + t_x$$

The projection of the y-component of the vector field on the x-axis can be described by $$pv_y(x) = \frac{1}{N_y} = \sum_{y=-\frac{N_y}{2}}^{\frac{N_y}{2}} (x\sin\Theta + y(\cos\Theta - 1) + t_y)$$

$$pv_y(x) = x\sin\Theta + t_y$$

and the projection of the y-component of the vector field on the y-axis can be described by $$pv_y = \frac{1}{N_x} = \sum_{y=-\frac{N_x}{2}}^{\frac{N_x}{2}} (x\sin\Theta + y(\cos\Theta - 1) + t_y)$$

$$pv_y(y) = y(\cos\Theta - 1) + t_y$$

From the above it is apparent that the rotation can be determined by means of the properties of the projection of the vector field. Each of the projections is comprised of a multiplier and the rotation angle as transformation parameter.

The overall transformation can be described by the following displacement equation $$[v_x v_y] = [xy](sR(\Theta) - I) + T$$

$$[v_x v_y] = [xy]\begin{bmatrix} s\cos\Theta - 1 & s\sin\Theta \\ -s\sin\Theta & s\cos\Theta - 1 \end{bmatrix} + T$$

The elements of the transformation matrix s and θ can be declared as $$\begin{bmatrix} s\cos\Theta - 1 & s\sin\Theta \\ -s\sin\Theta & s\cos\Theta - 1 \end{bmatrix} = \begin{bmatrix} m_1 & m_2 \\ -m_2 & m_1 \end{bmatrix}$$

Which parameters can be determined from the trigonometry equations $$\sin^{2\Theta + \cos 2}\Theta = 1$$

$$m_2^2 + (m_1 + 1)^2 = s^2$$

After having calculated the projections of the vector components on the axis, the multiplier and mean values of the projections can be calculated (110) to obtain the transformation parameters.

The relevance of a scale translation to the projection functions is illustrated in FIG. 5. Illustrated is a vector field 500, which image is subjected to a scale translation through zooming. As can be seen from the projection function $pv_x(x)$ of the x-components onto the x-axis, and the projection function $pv_y(y)$ of the y-components onto the y-axis the scale factor s is in close relation to the angle φ of the projection function. The relation is tan φ=(s−1). The scaling has no effect on the projection function $pv_y(x)$ of the y-components onto the x-axis, and the projection function $pv_x(y)$ of the x-components onto the y-axis.

The relevance of rotation translation to the projection functions is illustrated in FIG. 6. Illustrated is a vector field 600, which image is subjected to a rotation translation by an angle θ. As can be seen from the rotation is in close relation to the angle $\phi_1$ of the projection function $pv_x(x)$ of the x-component on the x-axis and to the angle $\phi_2$ of the projection function $pv_y(x)$ of the y-component on the x-axis. Further, the rotation is in close relation to the angle $\phi_2$ of the projection function $pv_x(y)$ of the x-component on the y-axis and to the angle $\phi_1$ of the projection function $pv_y(y)$ of the y-component on the y-axis. The relation is tan $\phi_1$=cos 0−1 and tan $\phi_2$=sin 0.

These gain and multiplier values can be obtained by using the primitive function of the projections. With the primitive function, the area of the projection, which is related to the multiplier, can be determined. Disregarding the mean value or the translation parameter results in that the total area of the projection is related to the extreme of the primitive function.

Having subtracted the average values from the projection functions, the extreme points of the primitive functions can be obtained, which allow calculating the gain and multiplier. For example, FIG. 7 illustrates the relation between the projection function and the gain/multiplier. A projection function $pv_x(x)$ of the x-components on the x-axis is illustrated 700. First, the average value $t_x$ can be eliminated, as this value may represent a translation. The resulting function 702 may only represent the gain.

The area of the function 702 may be related to the gain. Integrating the function 702 using the Euler method with a recursive adder may result in the primitive function 704. The maximum of function 704 may be related to the gain.

Putting it into terms, for example, when considering only the x-component of the vector field projected on the x-axis results in $$Pv_x(bx) = \sum_{i=-\frac{N_{bx}}{2}}^{bx} ((pv_x(i) - t_x) \cdot bs_x)$$

$$Pv_x(bx) = \sum_{i=-\frac{N_{bx}}{2}}^{bx} (m_1 i \cdot bs_x),$$

where $bs_x$ is the associate block size of the vectors. The extreme of the primitive function is on the point where its derivative function is zero. In this case, this is zero. At the point zero, the primitive function is $$Pv_x(0) = \sum_{i=-\frac{N_{bx}}{2}}^{0} (m_1 i \cdot bs_x)$$

$$Pv_x(0) = \frac{-\left(\frac{N_{bx}}{2}\left(\frac{N_{bx}}{2} + 1\right)\right)}{2} m_1 \cdot bs_x,$$

which means that once the extreme of the primitive function is found, the multiplier can be calculated by means of the above equation. The projections on the other axes can be used to obtain all other values.

FIG. 2 illustrates a device for carrying out the calculation of the translation parameters. An input video signal is input at terminal 200. Within motion estimating circuit 202, the motion vectors are estimated. The motion vector estimation can be carried out on consecutive frames of the input video signal. For example, using three consecutive images allows determining the motion vector of pixels over three consecutive frames. With the estimated motion vectors, the motion estimator 202 outputs a vector field describing the motion of the pixels. This output is fed to projecting circuit 204. Projecting circuit 204 projects the components of the motion vectors onto the axes of the coordination system. The output of projecting circuit 204 are the values of the corresponding projections of the motion vectors on the respective axis. This projection is used within calculation circuit 206 to obtain the translation parameters. In calculation circuit 206, the multipliers and mean values of the projections of the vector fields are calculated. This may be done by using a polynomial fit method or a primitive function of the projection. This may be done using the Euler method. The output of calculation circuit 206 are transformation parameters for describing a motion model of camera motion.

The accuracy of the transformation model is depended on the accuracy of the vector field. It also depends on the consistency of the vector field. The accuracy of the transformation model decreases with objects in the frame that are moving otherwise than the camera movement.

The parameters are put out at output terminal 208.

The invention claimed is:

1. A method of obtaining transformation parameters from a vector field with an image processing device, the method comprising
receiving a video image from a video source, the video image having consecutive video frames;
obtaining, with a processor, the vector field from the video image;
projecting, with the processor, the vector field on at least one axis;
deriving, with the processor, the transformation parameters from the projection of the vector field;
compressing, with the processor, the video image using the transformation parameters; and
storing the compressed video image on a non-transitory computer-readable medium.

2. The method of claim 1, wherein the vector field is described by estimated motion vectors describing motion in an image.

3. The method of claim 1, wherein the vector field comprises vectors with at least one first component and at least one second component, and wherein the first component is parallel to a first axis and wherein the second component is parallel to a second axis.

4. The method of claim 3, wherein projecting at least one component on at least one axis isolates at least a scale parameter.

5. The method of claim 4, wherein the scale parameter is calculated from at least one multiplier of the projection(s) on at least one axis.

6. The method of claim 3, wherein projecting at least one component on at least one axis isolates at least a translation parameter.

7. The method of claim 6, wherein the translation parameter is calculated from a mean value of the projection on one axis.

8. The method of claim 3, wherein projecting at least one component on at least one axis isolates at least a rotation parameter.

9. The method of claim 7, wherein the rotation parameter is calculated from at least one multiplier of the projection(s) on at least one axis.

10. The method of claim 1, wherein the transformation parameters are obtained from a curve fit algorithm applied to the projections.

11. The method of claim 1, wherein the transformation parameters are obtained from a primitive functions of the projections.

12. The method of claim 11, wherein the primitive function is an Euler function.

13. The method of claim 11, wherein at least one parameter is calculated from an extreme of the primitive function.

14. The method of claim 1, wherein the translation parameters represent a global model of camera motion.

15. A non-transitory computer-readable medium encoded with data instructions operable to cause a processor, when operated, to obtain transformation parameters, causes a computing device to:
receive a video image from a video source, the video image having consecutive video frames;
obtain a vector field from the video image;
project the vector field on at least one axis;
derive the transformation parameters from the projection of the vector field;
compressing, with the processor, the video image using the transformation parameters; and
storing the compressed video image on the non-transitory computer-readable medium.

16. An apparatus configured to obtain transformation parameters, comprising:
a video input configured to receive a video image from a video source, the video image having consecutive video frames;
a motion estimator within a computer processor configured to obtain a vector field,
a projecting circuit within the computer processor configured to project the vector field on at least one axis;
a calculation circuit within the computer processor, configured to derive the transformation parameters from the projection of the vector field, and compressing the video image using the transformation parameters; and
a non-transitory computer-readable medium configured to store the compressed video image.

17. The method of claim 1 wherein the video source is a camera.

18. The method of claim 15 wherein the video source is a camera.

19. The method of claim 16 wherein the video source is a camera.

* * * * *